United States Patent
Kwak et al.

(10) Patent No.: US 11,785,644 B2
(45) Date of Patent: Oct. 10, 2023

(54) RANDOM ACCESS CHANNEL TRANSMISSIONS USING RESOURCES ASSOCIATED WITH SYNCHRONIZATION SIGNAL BLOCKS

(71) Applicant: QUALCOMM Incorporated, San Diego, CA (US)

(72) Inventors: Yongjun Kwak, San Diego, CA (US); Jing Lei, San Diego, CA (US); Hung Dinh Ly, San Diego, CA (US); Huilin Xu, Temecula, CA (US); Seyedkianoush Hosseini, San Diego, CA (US); Yuchul Kim, San Diego, CA (US); Wanshi Chen, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/304,152

(22) Filed: Jun. 15, 2021

(65) Prior Publication Data
US 2022/0061097 A1     Feb. 24, 2022

Related U.S. Application Data

(60) Provisional application No. 62/706,484, filed on Aug. 19, 2020.

(51) Int. Cl.
*H04W 74/08* (2009.01)
*H04W 56/00* (2009.01)
*H04B 17/318* (2015.01)
*H04W 24/10* (2009.01)
*H04W 72/542* (2023.01)

(52) U.S. Cl.
CPC ...... *H04W 74/0833* (2013.01); *H04B 17/318* (2015.01); *H04W 24/10* (2013.01); *H04W 56/001* (2013.01); *H04W 72/542* (2023.01)

(58) Field of Classification Search
CPC . H04W 24/10; H04W 72/085; H04W 56/001; H04W 72/14; H04W 74/0833; H04B 17/30–318; H04L 1/189; H04L 1/1893; H04L 1/1896
See application file for complete search history.

(56) References Cited

U.S. PATENT DOCUMENTS

| | | | |
|---|---|---|---|
| 2020/0274606 A1* | 8/2020 | Kang | H04W 74/0833 |
| 2021/0051707 A1* | 2/2021 | Rastegardoost | H04B 17/318 |
| 2021/0058971 A1* | 2/2021 | MolavianJazi | H04L 1/189 |
| 2022/0046714 A1* | 2/2022 | Zhou | H04W 72/14 |
| 2023/0060894 A1* | 3/2023 | Rastegardoost | H04L 5/0048 |

* cited by examiner

*Primary Examiner* — Awet Haile
*Assistant Examiner* — Prince A Mensah
(74) *Attorney, Agent, or Firm* — Harrity & Harrity, LLP

(57) ABSTRACT

Various aspects of the present disclosure generally relate to wireless communication. In some aspects, a user equipment (UE) may select a synchronization signal block (SSB) from a plurality of SSBs received from a base station based at least in part on a power measurement associated with the SSB. The UE may determine a physical random access channel (PRACH) coverage enhancement (CE) level that is associated with the SSB. The UE may perform, with the base station, a PRACH transmission on PRACH resources associated with the SSB and the PRACH CE level. Numerous other aspects are provided.

26 Claims, 9 Drawing Sheets

RANDOM ACCESS CHANNEL TRANSMISSIONS USING RESOURCES ASSOCIATED WITH SYNCHRONIZATION SIGNAL BLOCKS

CROSS-REFERENCE TO RELATED APPLICATION

This Patent Application claims priority to Provisional Patent Application No. 62/706,484, filed on Aug. 19, 2020, entitled "RANDOM ACCESS CHANNEL TRANSMISSIONS USING RESOURCES ASSOCIATED WITH SYNCHRONIZATION SIGNAL BLOCKS," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for random access channel transmissions using resources associated with synchronization signal blocks.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes: selecting a synchronization signal block (SSB) from a plurality of SSBs received from a base station based at least in part on a power measurement associated with the SSB; determining a physical random access channel (PRACH) coverage enhancement (CE) level that is associated with the SSB; and performing, with the base station, a PRACH transmission on PRACH resources associated with the SSB and the PRACH CE level.

In some aspects, a UE for wireless communication includes a memory and one or more processors, coupled to the memory, configured to: select an SSB from a plurality of SSBs received from a base station based at least in part on a power measurement associated with the SSB; determine a PRACH CE level that is associated with the SSB; and perform, with the base station, a PRACH transmission on PRACH resources associated with the SSB and the PRACH CE level.

In some aspects, a non-transitory computer-readable medium storing a set of instructions for wireless communication includes: one or more instructions that, when executed by one or more processors of a UE, cause the UE to: select an SSB from a plurality of SSBs received from a base station based at least in part on a power measurement associated with the SSB; determine a PRACH CE level that is associated with the SSB; and perform, with the base station, a PRACH transmission on PRACH resources associated with the SSB and the PRACH CE level.

In some aspects, an apparatus for wireless communication includes: means for selecting an SSB) from a plurality of SSBs received from a base station based at least in part on a power measurement associated with the SSB; means for determining a PRACH CE level that is associated with the SSB; and means for performing, with the base station, a PRACH transmission on PRACH resources associated with the SSB and the PRACH CE level.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
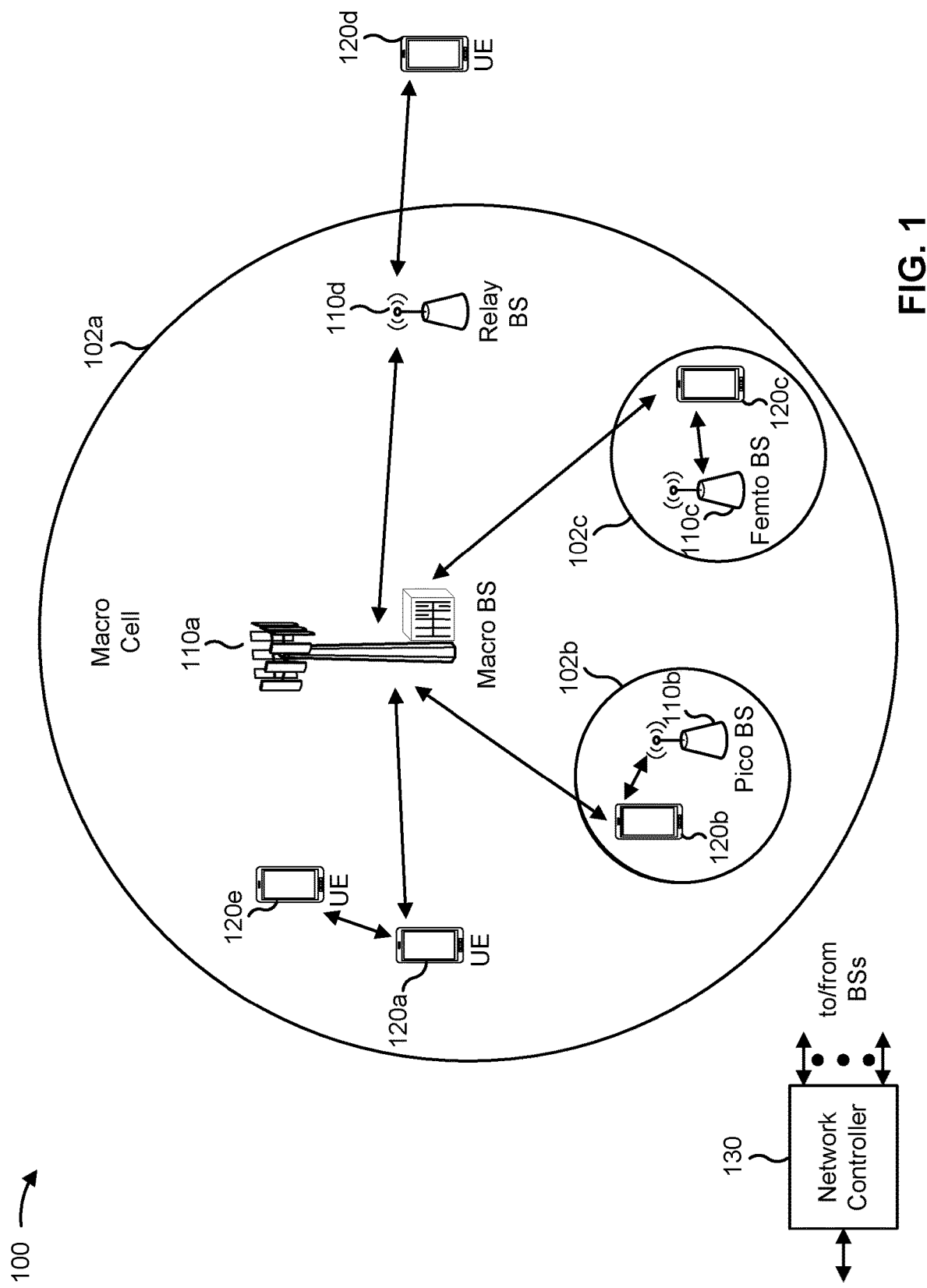
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
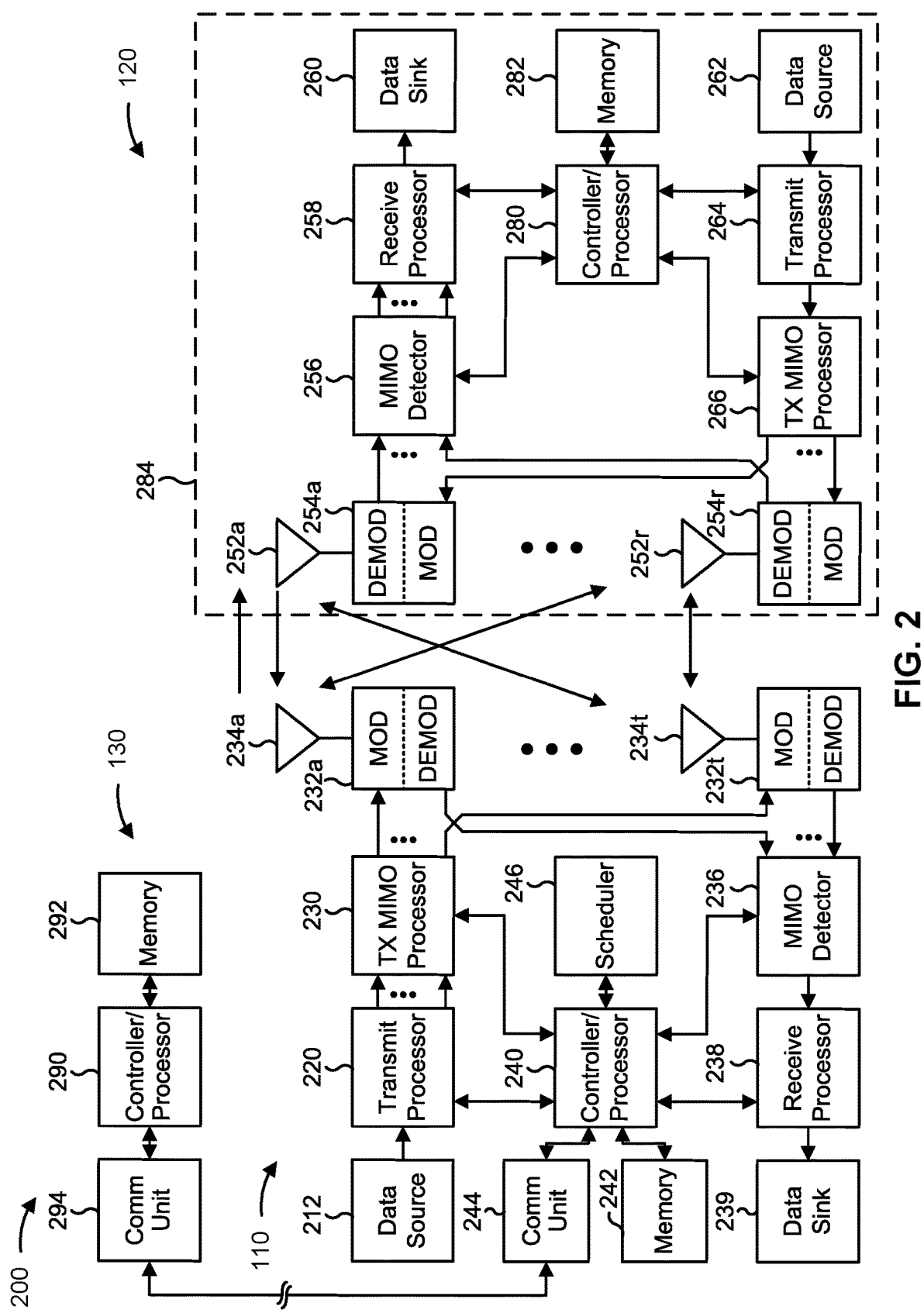
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-9).

The controller/processor 240 of the base station 110, the controller/processor 280 of the UE 120, and/or any other component(s) of FIG. 2 may perform one or more techniques associated with random access channel transmissions using resources associated with synchronization signal blocks, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) may include means for selecting a synchronization signal block (SSB) from a plurality of SSBs received from a base station based at least in part on a power measurement associated with the SSB, means for determining a physical random access channel (PRACH) coverage enhancement (CE) level that is associated with the SSB, and/or means for performing, with the base station, a PRACH transmission on PRACH resources associated with the SSB and the PRACH CE level. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
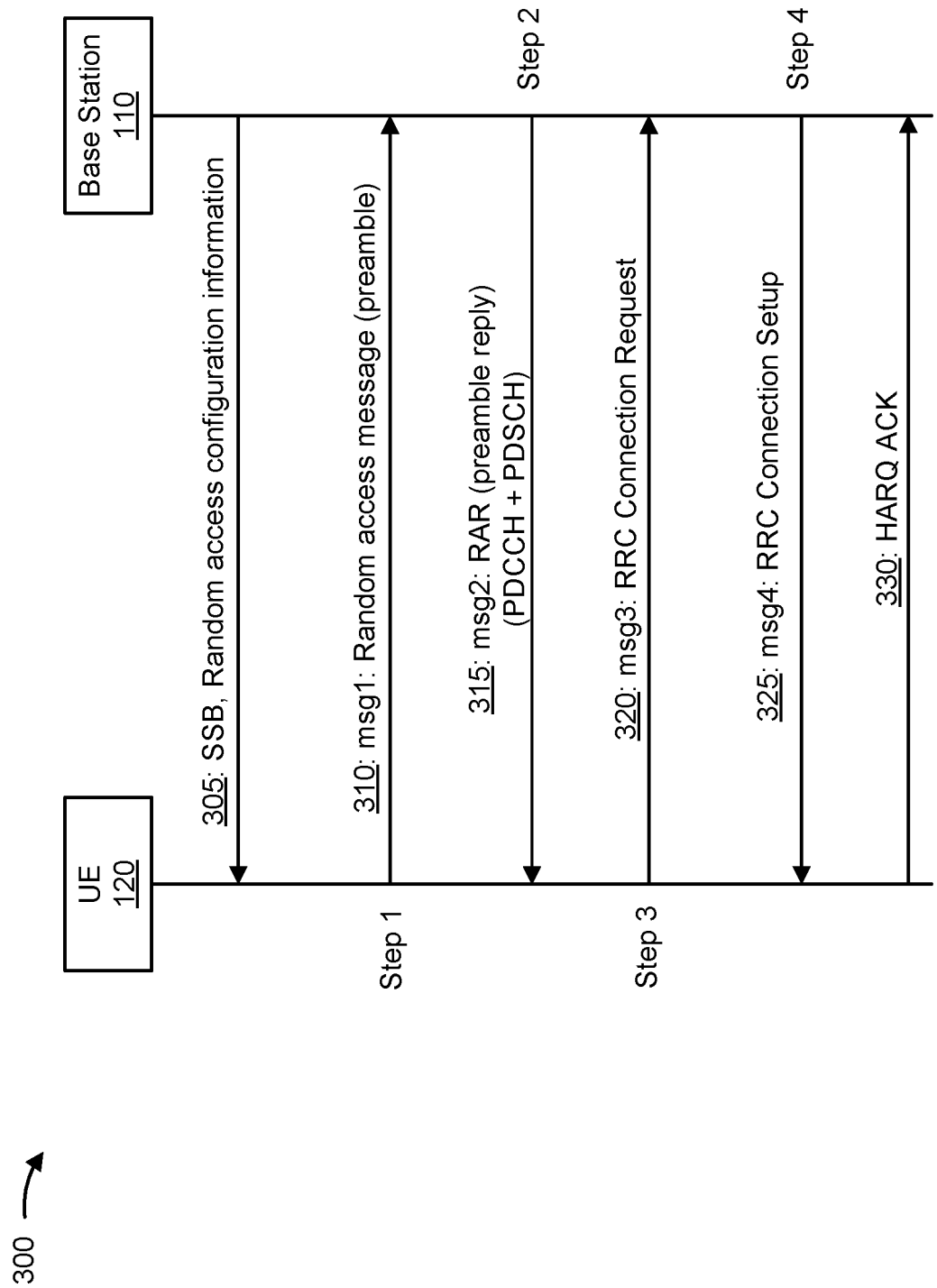
FIG. 3 is a diagram illustrating an example of a four-step random access procedure, in accordance with the present disclosure.

FIG. 3 is a diagram illustrating an example 300 of a four-step random access procedure, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a random access channel (RACH) procedure, such as for contention-free random access. The random access configuration information may include one or more parameters to be used in the random access procedure, such as one or more parameters for transmitting a random access message (RAM), and/or one or more parameters for receiving a random access response (RAR).

As shown by reference number 310, the UE 120 may transmit a RAM, which may include a preamble (sometimes referred to as a random access preamble, a PRACH preamble, and/or a RAM preamble). The message that includes the preamble may be referred to as a message 1, msg1, MSG1, a first message, and/or an initial message in a four-step random access procedure. The random access message may include a random access preamble identifier.

As shown by reference number 315, the base station 110 may transmit a RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a medium access control protocol data unit (MAC PDU) of the PDSCH communication.

As shown by reference number 320, the UE 120 may transmit an RRC connection request message. The RRC connection request message may be referred to as message 3, msg3, MSG3, or a third message of a four-step random access procedure. In some aspects, the RRC connection request may include a UE identifier, uplink control information (UCI), and/or a physical uplink shared channel (PUSCH) communication (e.g., an RRC connection request).

As shown by reference number 325, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 330, if the UE 120 successfully receives the RRC connection setup message, the UE 120 may transmit a hybrid automatic repeat request (HARD) acknowledgement (ACK).

As indicated above, FIG. 3 is provided as an example. Other examples may differ from what is described with regard to FIG. 3.

Figure 4:
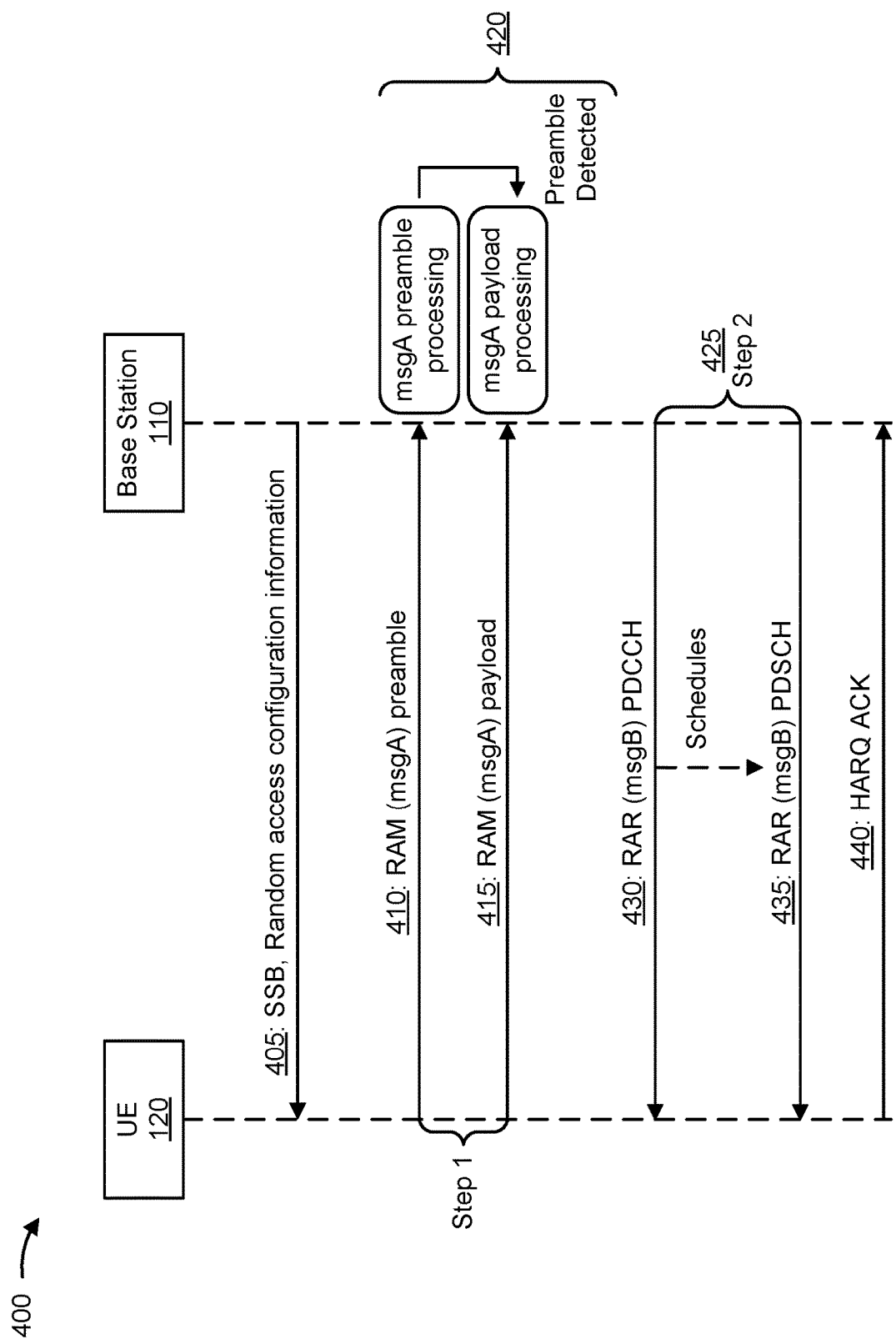
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a base station 110 and a UE 120 may communicate with one another to perform the two-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in a radio resource control (RRC) message and/or a PDCCH order message that triggers a RACH procedure, such as for contention-free random access. The random access configuration information may include one or more parameters to be used in the two-step random access procedure, such as one or more parameters for transmitting a RAM, and/or a RAR to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, and/or an initial message in a two-step random access procedure. Furthermore, in some aspects, the RAM preamble may be referred to as a message A preamble, a msgA preamble, a preamble, and/or a physical random access channel (PRACH) preamble, and the RAM payload may be referred to as a message A payload, a msgA payload, and/or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a PUSCH transmission).

As shown by reference number 420, the base station 110 may receive the RAM preamble transmitted by the UE 120.

If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in an MAC PDU of the PDSCH communication. As shown by reference number 440, if the UE 120 successfully receives the RAR, the UE 120 may transmit a HARQ ACK.

As indicated above, FIG. 4 is provided as an example. Other examples may differ from what is described with regard to FIG. 4.

In order to improve scalability and deployment of NR in a more efficient and cost-effective manner, upcoming releases of NR may target UEs having reduced capabilities. The upcoming releases of NR may target UEs having reduced capabilities by reducing peak throughput, latency, and/or reliability. The upcoming releases of NR may define improvements in coverage, complexity, and/or power consumption, which may be beneficial for UEs that support low power wide area (LPWA) uses cases. The UEs that support the LPWA use cases may be metering devices, asset tracking devices, and/or personal IoT devices.

During a PRACH procedure between a UE and a base station, the UE may perform a PRACH transmission with the base station. The PRACH transmission may be associated with a Msg-1 when the PRACH procedure between the UE and the base station is a 4-step PRACH procedure. Alternatively, the PRACH transmission may be associated with a Msg-A when the PRACH procedure between the UE and the base station is a 2-step PRACH procedure.

The UE may receive a system information block (SIB) that configures an SSB to RACH occasion (SSB-RO) mapping for the UE. The SSB-RO mapping may be a one-to-one mapping between an SSB and PRACH resources. The SSB may also be referred to herein as an SSB beam. The PRACH resources may be defined in a time domain and in a frequency domain.

The UE may perform the PRACH transmission for a multi-beam SSB received from the base station. For example, the UE may receive a plurality of SSBs from the base station. The UE may measure a power level associated with each of the plurality of SSBs received from the base station. The measured power level may be a RSRP measurement. The UE may select an SSB from the plurality of SSBs based at least in part on a measured power level for each of the plurality of SSBs.

The UE may compare the measured power level for each of the plurality of SSBs to a configured threshold. The configured threshold may be included in the SIB received at the UE. When measured power levels of one or more SSBs satisfy the configured threshold (e.g., an RSRP measurement for the one or more SSBs is greater than the configured threshold), the UE may select an SSB from the one or more SSBs. When measured power levels for each of the plurality of SSBs do not satisfy the configured threshold (e.g., RSRP measurements for the SSBs are less than the configured threshold), the UE may select an SSB from the plurality of SSBs.

The UE may select the SSB from the plurality of SSBs based at least in part on the measured power levels associated with the plurality of SSBs. The UE may select a PRACH resource associated with the SSB. The UE may perform the PRACH transmission using the PRACH resource associated with the SSB.

Figure 5:
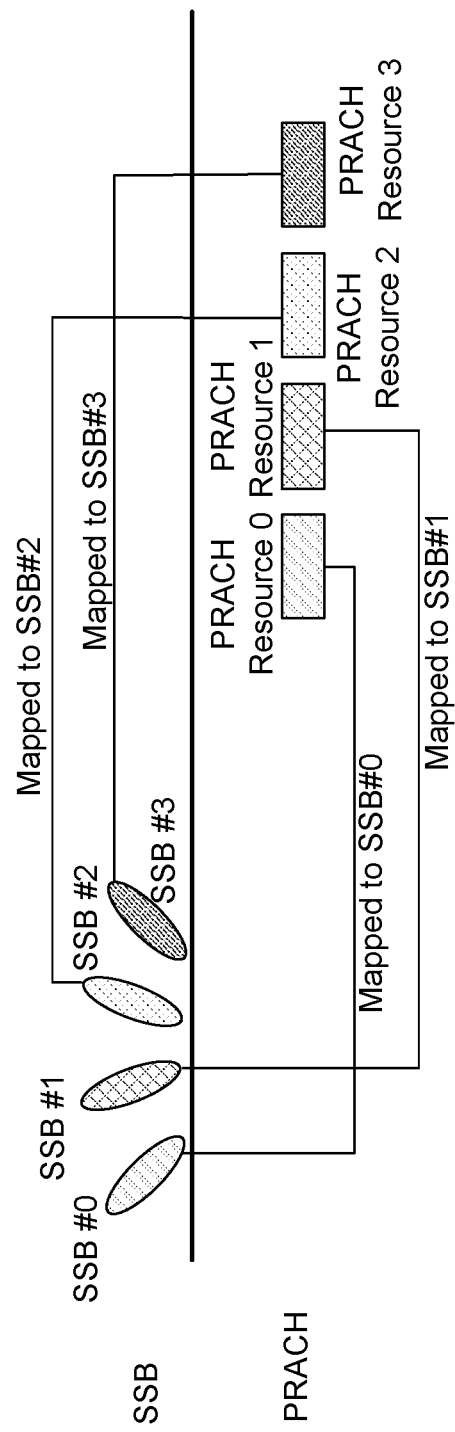
FIG. 5 is a diagram illustrating an example of mappings between SSBs and PRACH resources, in accordance with the present disclosure.

FIG. 5 is a diagram illustrating an example 500 of mappings between SSBs and PRACH resources, in accordance with the present disclosure.

As shown in FIG. 5, a first SSB (SSB #0) may be mapped to a first PRACH resource (PRACH resource 0), a second SSB (SSB #1) may be mapped to a second PRACH resource (PRACH resource 1), a third SSB (SSB #2) may be mapped to a third PRACH resource (PRACH resource 2), and a fourth SSB (SSB #3) may be mapped to a fourth PRACH resource (PRACH resource 3). An SSB may be mapped to a PRACH resource in accordance with a one-to-one mapping.

As indicated above, FIG. 5 is provided as an example. Other examples may differ from what is described with regard to FIG. 5.

Upcoming releases of NR may support coverage enhancements for PRACH by introducing PRACH repetitions. "PRACH repetition" may refer to a repetition of a PRACH transmission between a UE and a base station. Depending on a measured power level of an SSB, PRACH coverage extension (CE) levels may be determined based on a SIB configuration received at the UE from a base station. The PRACH repetitions may be associated with the PRACH CE levels.

However, UEs are not currently configured to select PRACH resources for multiple PRACH CE levels and multiple SSBs. In other words, UEs are not currently configured to account for PRACH CE levels when selecting PRACH resources for a particular SSB. As a result, UEs are not currently configured to select PRACH resources for PRACH repetitions because the PRACH repetitions depend on the PRACH CE levels.

In various aspects of techniques and apparatuses described herein, PRACH resource partitioning for different PRACH CE levels per each SSB may be defined, which may enable PRACH repetitions in a multi-bean SSB operation scenario. The PRACH resource partitioning may include an equal portioning regardless of the SSB. Additionally or alternatively, the PRACH resource partitioning may include an unequal portioning depending on the SSB.

In various aspects of techniques and apparatuses described herein, the PRACH resource partitioning may enable PRACH repetitions for a PRACH transmission associated with a Msg-1 of a 4-step RACH procedure between the UE and the base station. Alternatively, the PRACH resource partitioning may enable PRACH repetitions for a PRACH transmission associated with a Msg-A of a 2-step RACH procedure between the UE and the base station.

In various aspects of techniques and apparatuses described herein, the PRACH resource partitioning described herein may be applicable to legacy UEs. In other words, the PRACH resource partitioning described herein may be applicable to UEs not having reduced capabilities.

Figure 6:
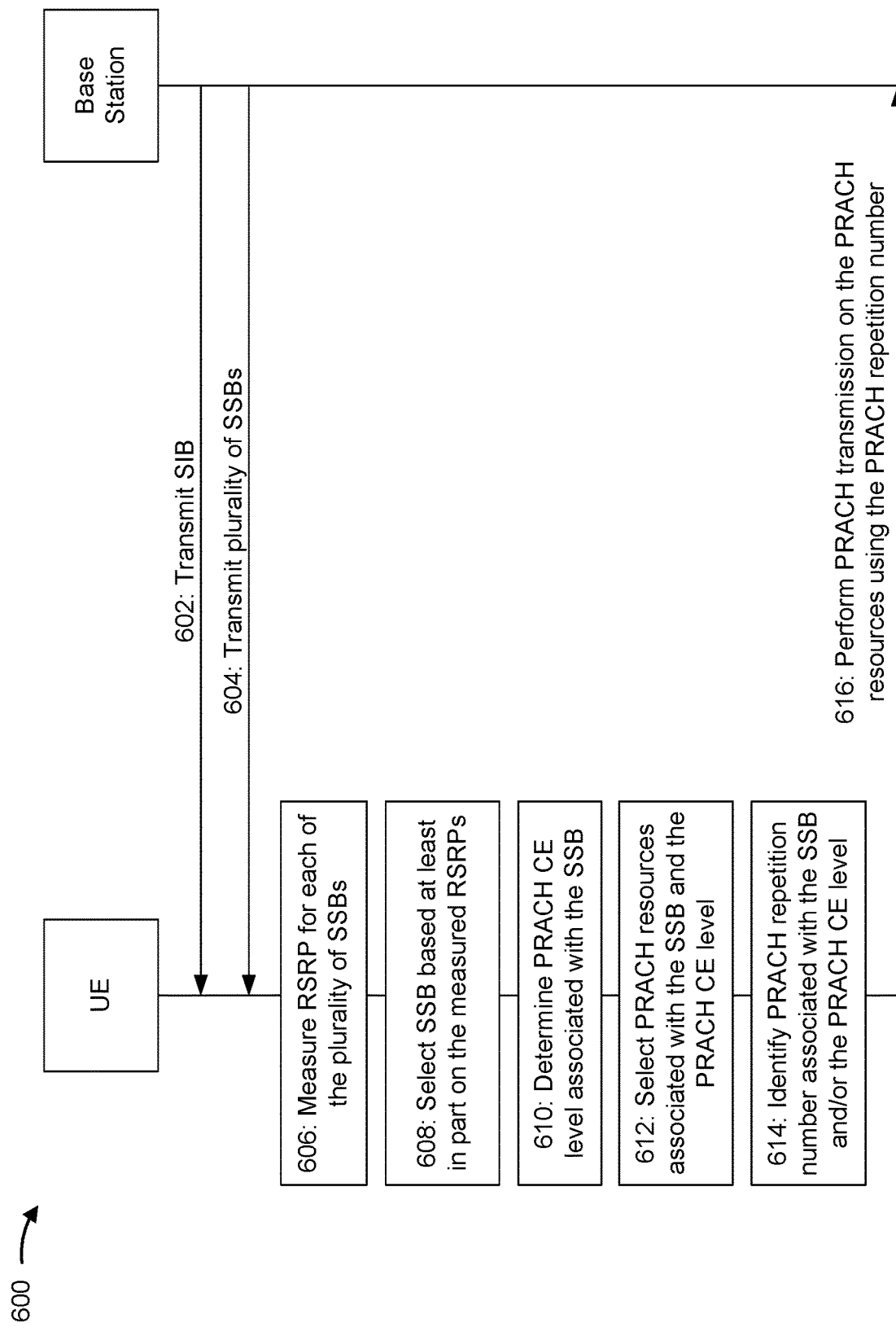
FIGS. 6-8 are diagrams illustrating examples associated with random access channel transmissions using resources associated with synchronization signal blocks, in accordance with the present disclosure.

FIG. 6 is a diagram illustrating an example 600 of random access channel transmissions using resources associated with synchronization signal blocks, in accordance with the present disclosure. As shown in FIG. 6, example 600 includes communication between a UE (e.g., UE 120) and a base station (e.g., base station 110). In some aspects, the UE and the base station may be included in a wireless network such as wireless network 100. The UE and the base station may communicate on a wireless access link, which may include an uplink and a downlink.

As shown by reference number 602, the base station may transmit a SIB (e.g., SIB 1) to the UE. The SIB may include a configuration for N PRACH CE levels per SSB and power measurement thresholds (e.g., RSRP measurement thresholds) for each PRACH CE level, where N is a positive integer. The SIB may define a PRACH resource partitioning based at least in part on SSBs and associated power measurement thresholds.

In some aspects, the SIB may include a configuration that defines a same number of PRACH CE levels for each SSB, and the power measurement thresholds may be commonly applied to the plurality of SSBs. In other words, the PRACH resource partitioning may be based at least in part on a joint configuration for the SSB(s) and the PRACH CE levels.

In some aspects, the SIB may include a configuration that defines the power measurement thresholds per SSB, and a different number of PRACH CE levels and separate power measurement thresholds may be configured for each SSB. In other words, the PRACH resource partitioning may be based at least in part on a separate configuration for the SSB(s) and the PRACH CE levels.

As shown by reference number 604, the base station may transmit a plurality of SSBs to the UE. The SSBs may also be referred to as SSB beams. The SSB may include a primary synchronization signal, a secondary synchronization signal and a physical broadcast channel. Synchronization signals may be used for RSRP and/or RSRQ measurements.

As shown by reference number 606, the UE may perform a power measurement for each of the SSBs received from the base station. For example, the UE may measure an RSRP of each of the SSBs received from the base station.

As shown by reference number 608, the UE may select an SSB from the plurality of SSBs based at least in part on a power measurement associated with the SSB. The UE may select the SSB based at least in part on the power measurement associated with the SSB in relation to power measurements associated with other SSBs in the plurality of SSBs. In some aspects, the power measurement associated with the SSB may be greater than the power measurements associated with the other SSBs in the plurality of SSBs. For example, the UE may select an SSB associated with a largest RSRP measurement as compared to RSRP measurements of other SSBs in the plurality of SSBs.

As shown by reference number 610, the UE may determine a PRACH CE level that is associated with the SSB selected by the UE. The UE may compare the power measurement associated with the SSB to a set of power measurement thresholds. The UE may determine the PRACH CE level based at least in part on the comparison between the power measurement associated with the SSB and the set of power measurement thresholds.

In some aspects, the UE may compare the power measurement associated with the SSB to a set of power measurement thresholds to determine the PRACH CE level, where each power measurement threshold may be associated with a different PRACH CE level. The set of power measurement thresholds may be common to the plurality of SSBs received from the base station.

In some aspects, the UE may compare the power measurement associated with the SSB to a set of power measurement thresholds to determine the PRACH CE level. The set of power measurement thresholds may be specific to the SSB selected by the UE, where each power measurement threshold may be associated with a different PRACH CE level.

As shown by reference number 612, the UE may select PRACH resources associated with the SSB and the PRACH CE level. In other words, based at least in part on the SSB selected by the UE and the PRACH CE level selected by the UE, the corresponding PRACH resources may be selected by the UE.

In some aspects, the PRACH resources may be partitioned based at least in part on the SSB and the power measurement thresholds. The PRACH resources may be partitioned in a time domain and/or a frequency domain. Additionally or alternatively, the PRACH resources may be partitioned based at least in part by different sequences within a same time and frequency resource.

As shown by reference number 614, the UE may identify a PRACH repetition number associated with the SSB and/or the PRACH CE level. A PRACH CE level may be associated with a defined number of PRACH repetitions. For example, a first PRACH CE level may be associated with one PRACH repetition, a second PRACH CE level may be associated with two PRACH repetitions, a third PRACH CE level may be associated with four PRACH repetitions, and a fourth PRACH CE level may be associated with eight PRACH repetitions.

In one example, the PRACH CE level may correspond to a location of a UE within a cell. For example, for a UE that is located at a cell center, a connectivity level for the UE may be favorable, so the UE may determine a PRACH CE level that corresponds to a reduced number of PRACH repetitions. For a UE that is located at a cell edge, a connectivity level for the UE may be unfavorable, so the UE may determine a PRACH CE level that corresponds to an increased number of PRACH repetitions.

As shown by reference number 616, the UE may perform a PRACH transmission on PRACH resources associated with the SSB and the PRACH CE level. The UE may perform the PRACH transmission in accordance with the PRACH repetition number configured for the SSB and/or the PRACH CE level. The PRACH transmission may be included in a Msg-1 of a 4-step random access channel procedure between the UE and the base station. Alternatively, the PRACH transmission may be included in a Msg-A of a 2-step random access channel procedure between the UE and the base station.

In some aspects, in the 2-step random access channel procedure, the Msg-A may be associated with a PRACH transmission and a PUSCH transmission. A first repetition number for the PRACH transmission can be configured differently as compared to a second repetition number of the PUSCH transmission for each CE level. In other words, the first repetition number may be configured for the PRACH transmission associated with the Msg-A and the second repetition number may be configured for the PUSCH transmission associated with the Msg-A for each CE level.

As indicated above, FIG. 6 is provided as an example. Other examples may differ from what is described with regard to FIG. 6.

Figure 7:
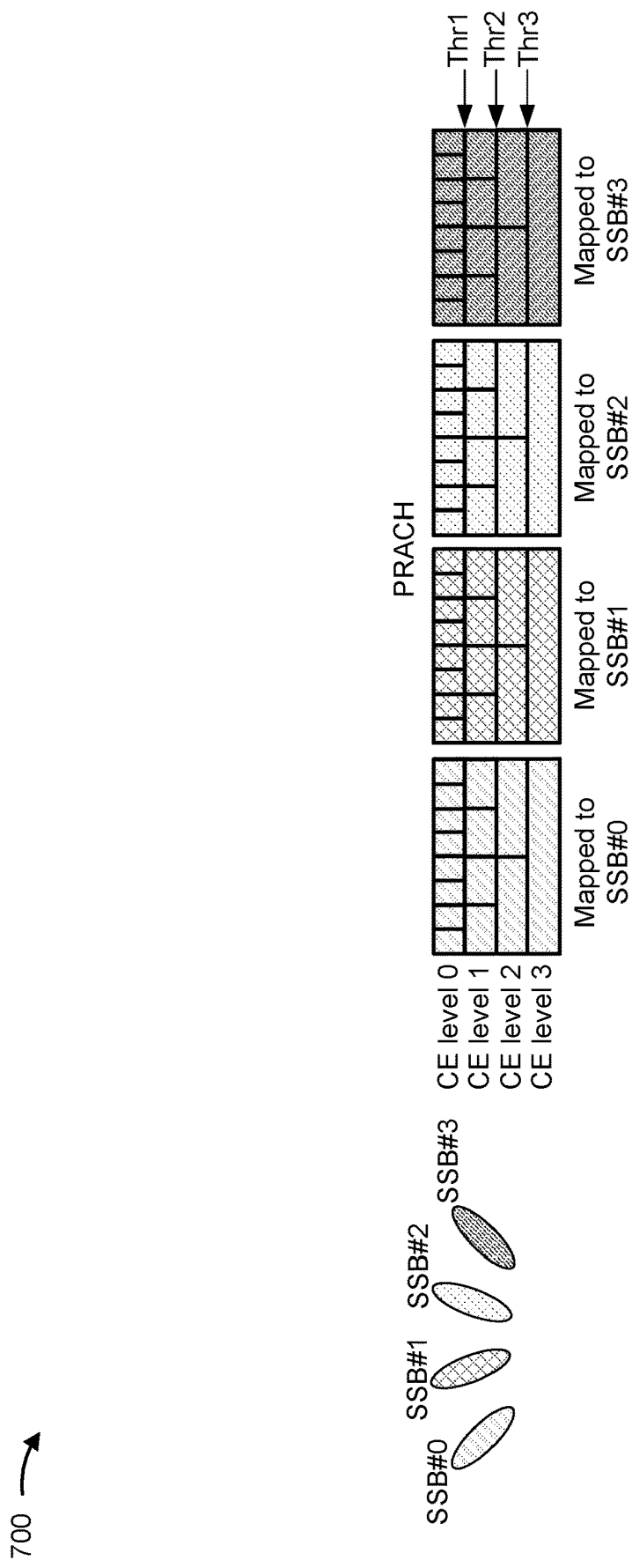

FIG. 7 is a diagram illustrating an example 700 of random access channel transmissions using resources associated with synchronization signal blocks, in accordance with the present disclosure.

As shown in FIG. 7, a first SSB (SSB #0) may be mapped to first PRACH resources, a second SSB (SSB #1) may be mapped to second PRACH resources, a third SSB (SSB #2) may be mapped to third PRACH resources, and a fourth SSB (SSB #3) may be mapped to fourth PRACH resources.

The first PRACH resources may be associated with a plurality of PRACH CE levels (e.g., four different PRACH CE levels). For example, the first PRACH resources may be associated with a first PRACH CE level (CE level 0), a second PRACH CE level (CE level 1), a third PRACH CE level (CE level 2), and a fourth PRACH CE level (CE level 3). A PRACH CE level may be associated with a number of PRACH repetitions. For example, the first PRACH CE level may be associated with one PRACH repetition, the second PRACH CE level may be associated with two PRACH repetitions, the third PRACH CE level may be associated with four PRACH repetitions, and the fourth PRACH CE level may be associated with eight PRACH repetitions.

Similarly, the second, third, and fourth PRACH resources may be associated with the plurality of PRACH CE levels. For example, each of the second, third, and fourth PRACH resources may be associated with the first, second, third, and fourth PRACH CE levels.

In one example, a set of power measurement thresholds (e.g., RSRP measurement thresholds) may be associated with the plurality of PRACH CE levels. For example, a first power measurement threshold (Thr1), a second power measurement threshold (Thr2), and a third power measurement threshold (Thr3) may be associated with one or more of the first, second, third, and fourth PRACH CE levels.

In the example shown in FIG. 7, a same number of PRACH CE levels may be defined for each SSB, and the set of power measurement thresholds may be commonly applied to the plurality of SSBs (e.g., the four SSBs). In this example, a PRACH resource partitioning may be based at least in part on a joint configuration for the SSB(s) and the PRACH CE levels.

As indicated above, FIG. 7 is provided as an example. Other examples may differ from what is described with regard to FIG. 7.

Figure 8:
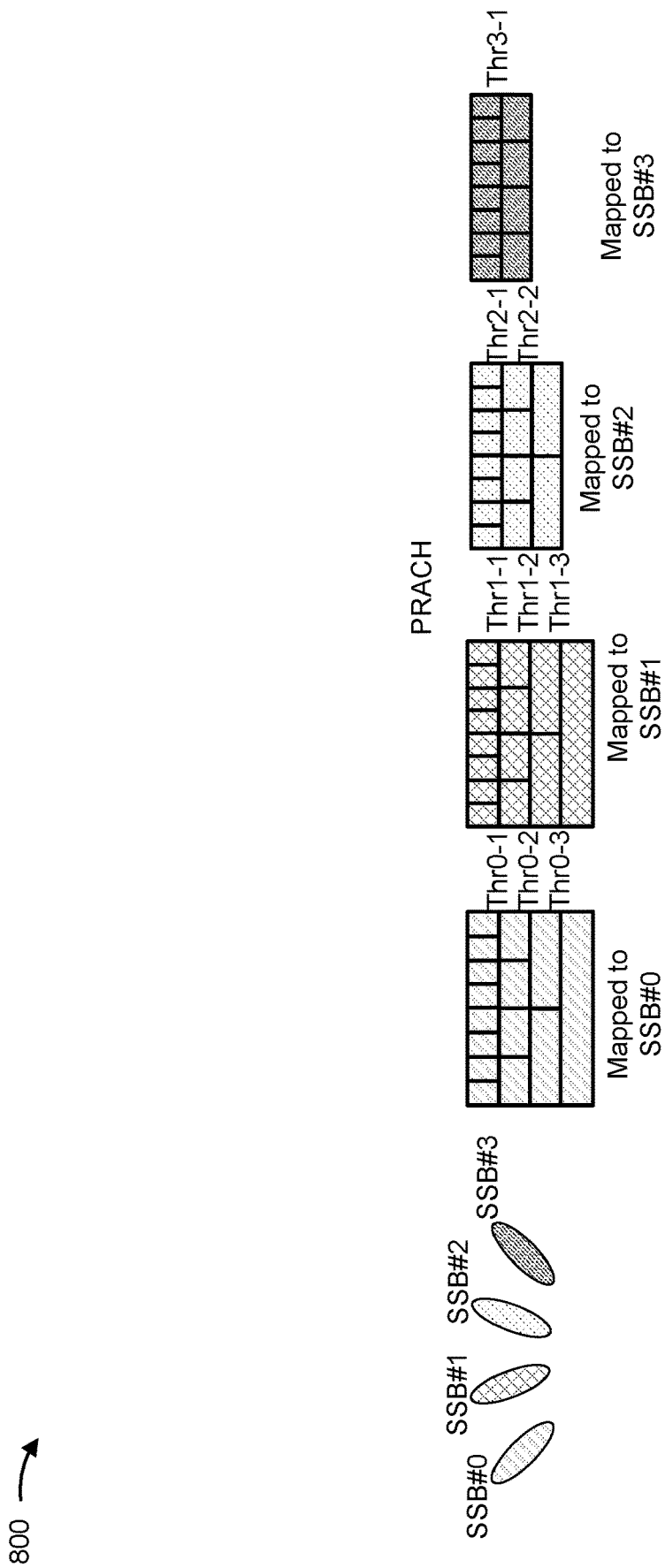

FIG. 8 is a diagram illustrating an example 800 of random access channel transmissions using resources associated with synchronization signal blocks, in accordance with the present disclosure.

As shown in FIG. 8, a first SSB (SSB #0) may be mapped to first PRACH resources, a second SSB (SSB #1) may be mapped to second PRACH resources, a third SSB (SSB #2) may be mapped to third PRACH resources, and a fourth SSB (SSB #3) may be mapped to fourth PRACH resources.

The PRACH resources may be associated with one or more PRACH CE levels. Depending on a particular PRACH resource, a number of PRACH CE levels may be defined. A particular PRACH CE level may be associated with a defined number of PRACH repetitions.

In one example, the first PRACH resources may be associated with four PRACH CE levels. A set of power measurement thresholds (e.g., RSRP measurement thresholds) may be configured for the first PRACH resources. The set of power measurement thresholds may include a first power measurement threshold (Thr0-1), a second power measurement threshold (Thr0-2), and a third power measurement threshold (Thr0-3). The set of power measurement thresholds may be specific to the first PRACH resources.

In one example, the second PRACH resources may be associated with four PRACH CE levels. A set of power measurement thresholds (e.g., RSRP measurement thresholds) may be configured for the second PRACH resources. The set of power measurement thresholds may include a first power measurement threshold (Thr1-1), a second power measurement threshold (Thr1-2), and a third power measurement threshold (Thr1-3). The set of power measurement thresholds may be specific to the second PRACH resources.

In one example, the third PRACH resources may be associated with three PRACH CE levels. A set of power measurement thresholds (e.g., RSRP measurement thresholds) may be configured for the first PRACH resources. The set of power measurement thresholds may include a first power measurement threshold (Thr2-1) and a second power measurement threshold (Thr2-2). The set of power measurement thresholds may be specific to the third PRACH resources.

In one example, the fourth PRACH resources may be associated with two PRACH CE levels. A power measurement threshold (e.g., RSRP measurement threshold) may be configured for the fourth PRACH resources. The power measurement threshold (Thr3-1) may be specific to the fourth PRACH resources.

In the example shown in FIG. 8, each SSB can cover a different size of area and the set of power measurement thresholds may depend on the SSB. Additionally, a different number of PRACH CE levels may be defined for each SSB, and the set of power measurement thresholds may be separately configured for each SSB (e.g., each of the four SSBs). In this example, a PRACH resource partitioning may be based at least in part on a separate configuration for the SSB(s) and the PRACH CE levels.

As indicated above, FIG. 8 is provided as an example. Other examples may differ from what is described with regard to FIG. 8.

Figure 9:
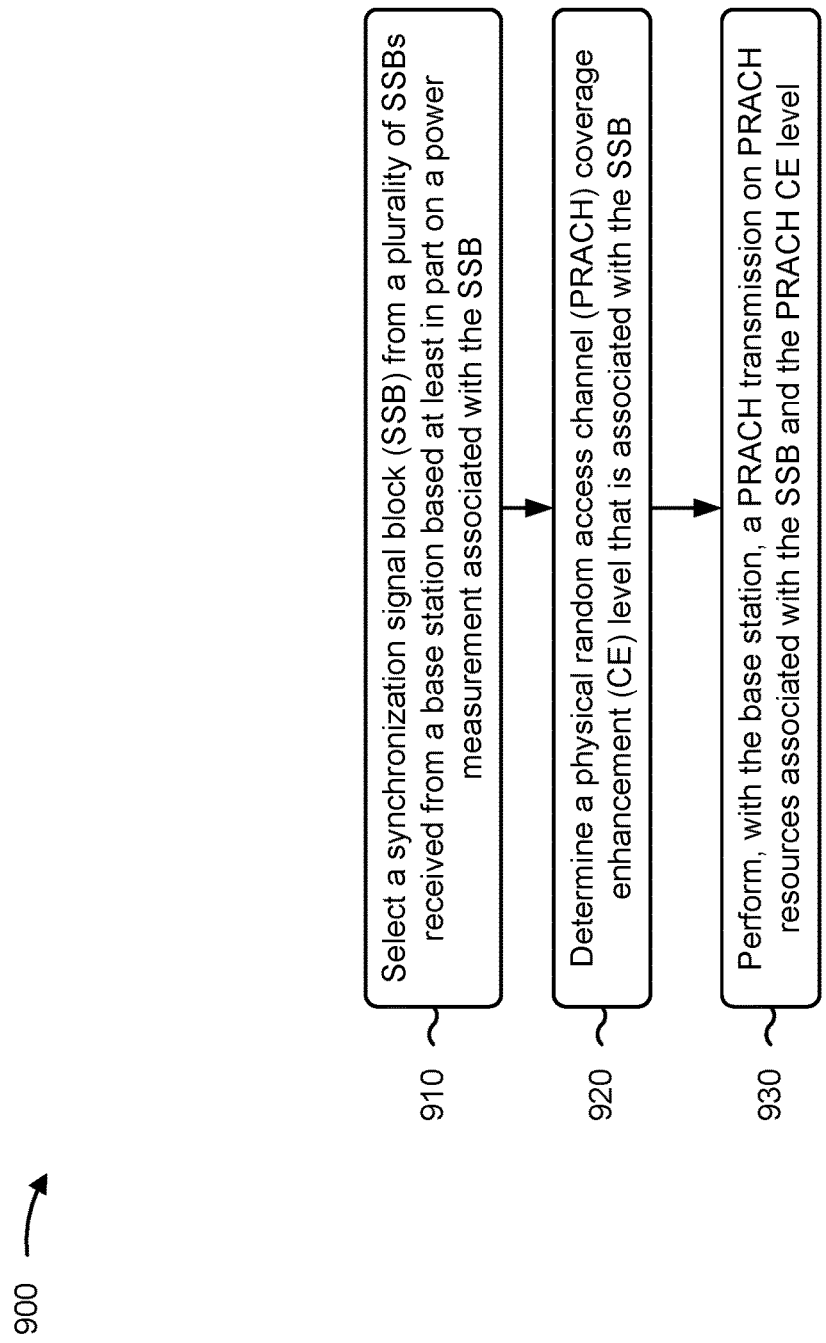
FIG. 9 is a diagram illustrating an example process associated with random access channel transmissions using resources associated with synchronization signal blocks, in accordance with the present disclosure.

FIG. 9 is a diagram illustrating an example process 900 performed, for example, by a UE, in accordance with the present disclosure. Example process 900 is an example where the UE (e.g., UE 120) performs operations associated with random access channel transmissions using resources associated with synchronization signal blocks.

As shown in FIG. 9, in some aspects, process 900 may include selecting an SSB from a plurality of SSBs received from a base station based at least in part on a power measurement associated with the SSB (block 910). For example, the UE (e.g., using antenna 252, demodulator 254, MIMO detector 256, receive processor 258, transmit processor 264, TX MIMO processor 266, modulator 254, controller/processor 280, and/or memory 282) may select an SSB from a plurality of SSBs received from a base station based at least in part on a power measurement associated with the SSB, as described above.

As further shown in FIG. 9, in some aspects, process 900 may include determining a PRACH CE level that is associated with the SSB (block 920). For example, the UE (e.g., using antenna 252, demodulator 254, MIMO detector 256, receive processor 258, transmit processor 264, TX MIMO processor 266, modulator 254, controller/processor 280, and/or memory 282) may determine a PRACH CE level that is associated with the SSB, as described above.

As further shown in FIG. 9, in some aspects, process 900 may include performing, with the base station, a PRACH transmission on PRACH resources associated with the SSB and the PRACH CE level (block 930). For example, the UE (e.g., using antenna 252, demodulator 254, MIMO detector 256, receive processor 258, transmit processor 264, TX MIMO processor 266, modulator 254, controller/processor 280, and/or memory 282) may perform, with the base station, a PRACH transmission on PRACH resources associated with the SSB and the PRACH CE level, as described above.

Process 900 may include additional aspects, such as any single aspect or any combination of aspects described below and/or in connection with one or more other processes described elsewhere herein.

In a first aspect, selecting the SSB from the plurality of SSBs comprises selecting the SSB based at least in part on the power measurement associated with the SSB in relation to power measurements associated with other SSBs in the plurality of SSBs.

In a second aspect, alone or in combination with the first aspect, the power measurement is a reference signal received power measurement.

In a third aspect, alone or in combination with one or more of the first and second aspects, the power measurement associated with the SSB is greater than the power measurements associated with the other SSBs in the plurality of SSBs.

In a fourth aspect, alone or in combination with one or more of the first through third aspects, determining the PRACH CE level comprises comparing the power measurement associated with the SSB to a set of power measurement thresholds, wherein each power measurement threshold is associated with a different PRACH CE level.

In a fifth aspect, alone or in combination with one or more of the first through fourth aspects, determining the PRACH CE level comprises comparing the power measurement associated with the SSB to a set of power measurement thresholds that are specific to the SSB, wherein each power measurement threshold is associated with a different PRACH CE level.

In a sixth aspect, alone or in combination with one or more of the first through fifth aspects, process 900 includes selecting the PRACH resources associated with the SSB and the PRACH CE level.

In a seventh aspect, alone or in combination with one or more of the first through sixth aspects, process 900 includes determining a PRACH repetition number associated with one or more of the PRACH CE level or the SSB, and performing the PRACH transmission comprises performing the PRACH transmission in accordance with the PRACH repetition number.

In an eighth aspect, alone or in combination with one or more of the first through seventh aspects, the PRACH resources are partitioned based at least in part on the SSB and power measurement threshold.

In a ninth aspect, alone or in combination with one or more of the first through eighth aspects, the PRACH resources are partitioned in one or more of a time domain or a frequency domain.

In a tenth aspect, alone or in combination with one or more of the first through ninth aspects, the PRACH resources are partitioned based at least in part by different sequences within a same time and frequency resource.

In an eleventh aspect, alone or in combination with one or more of the first through tenth aspects, process 900 includes receiving, from the base station, a system information block that includes a configuration for N PRACH CE levels per SSB and power measurement thresholds for each PRACH CE level, wherein N is a positive integer.

In a twelfth aspect, alone or in combination with one or more of the first through eleventh aspects, the configuration defines a same number of PRACH CE levels for each SSB, and the power measurement thresholds are commonly applied to the plurality of SSBs.

In a thirteenth aspect, alone or in combination with one or more of the first through twelfth aspects, the configuration defines the power measurement thresholds per SSB, and a different number of PRACH CE levels and separate power measurement thresholds are configured for each SSB.

In a fourteenth aspect, alone or in combination with one or more of the first through thirteenth aspects, the PRACH transmission is a Msg-1 or a Msg-A of a random access channel procedure.

In a fifteenth aspect, alone or in combination with one or more of the first through fourteenth aspects, a first repetition number is configured for the PRACH transmission associated with the Msg-A and a second repetition number is configured for a PUSCH transmission associated with the Msg-A for each CE level.

In a sixteenth aspect, alone or in combination with one or more of the first through fifteenth aspects, the PRACH CE level is associated with a defined number of PRACH repetitions for the PRACH transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: selecting a synchronization signal block (SSB) from a plurality of SSBs received from a base station based at least in part on a power measurement associated with the SSB; determining a physical random access channel (PRACH) coverage enhancement (CE) level that is associated with the SSB; and performing, with the base station, a PRACH transmission on PRACH resources associated with the SSB and the PRACH CE level.

Aspect 2: The method of Aspect 1, wherein selecting the SSB from the plurality of SSBs comprises selecting the SSB based at least in part on the power measurement associated with the SSB in relation to power measurements associated with other SSBs in the plurality of SSBs.

Aspect 3: The method of Aspect 2, wherein the power measurement is a reference signal received power measurement.

Aspect 4: The method of Aspect 2, wherein the power measurement associated with the SSB is greater than the power measurements associated with the other SSBs in the plurality of SSBs.

Aspect 5: The method of any of Aspects 1 through 4, wherein determining the PRACH CE level comprises: comparing the power measurement associated with the SSB to a set of power measurement thresholds, wherein each power measurement threshold is associated with a different PRACH CE level.

Aspect 6: The method of any of Aspects 1 through 5, wherein determining the PRACH CE level comprises: comparing the power measurement associated with the SSB to a set of power measurement thresholds that are specific to the SSB, wherein each power measurement threshold is associated with a different PRACH CE level.

Aspect 7: The method of any of Aspects 1 through 6, further comprising: selecting the PRACH resources associated with the SSB and the PRACH CE level.

Aspect 8: The method of any of Aspects 1 through 7, further comprising: determining a PRACH repetition number associated with one or more of the PRACH CE level or the SSB, and wherein performing the PRACH transmission comprises performing the PRACH transmission in accordance with the PRACH repetition number. wherein performing the PRACH transmission comprises performing the PRACH transmission in accordance with the PRACH repetition number.

Aspect 9: The method of any of Aspects 1 through 8, wherein the PRACH resources are partitioned based at least in part on the SSB and power measurement threshold.

Aspect 10: The method of Aspect 9, wherein the PRACH resources are partitioned in one or more of: a time domain, or a frequency domain.

Aspect 11: The method of Aspect 9, wherein the PRACH resources are partitioned based at least in part by different sequences within a same time and frequency resource.

Aspect 12: The method of any of Aspects 1 through 11, further comprising: receiving, from the base station, a system information block that includes a configuration for N PRACH CE levels per SSB and power measurement thresholds for each PRACH CE level, wherein N is a positive integer.

Aspect 13: The method of Aspect 12, wherein the configuration defines a same number of PRACH CE levels for each SSB, and wherein the power measurement thresholds are commonly applied to the plurality of SSBs.

Aspect 14: The method of Aspect 12, wherein the configuration defines the power measurement thresholds per SSB, and wherein a different number of PRACH CE levels and separate power measurement thresholds are configured for each SSB.

Aspect 15: The method of any of Aspects 1 through 14, wherein the PRACH transmission is a Msg-1 or a Msg-A of a random access channel procedure.

Aspect 16: The method of Aspect 15, wherein a first repetition number is configured for the PRACH transmission associated with the Msg-A and a second repetition number is configured for a physical uplink shared channel (PUSCH) transmission associated with the Msg-A for each CE level.

Aspect 17: The method of any of Aspects 1 through 16, wherein the PRACH CE level is associated with a defined number of PRACH repetitions for the PRACH transmission.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      select a synchronization signal block (SSB) from a plurality of SSBs received from a network entity based at least in part on a power measurement associated with the SSB;
      determine a physical random access channel (PRACH) coverage enhancement (CE) level from a quantity of PRACH CE levels defined for the SSB, at least one of a same quantity of PRACH CE levels being defined for each SSB of the plurality of SSBs or a particular quantity of PRACH CE levels being defined per SSB for each SSB of the plurality of SSBs;
      perform, with the network entity, a PRACH transmission on PRACH resources associated with the SSB and the PRACH CE level; and
      receive, from the network entity, a system information block that includes a configuration for N PRACH CE levels per SSB and power measurement thresholds for each PRACH CE level, wherein N is a positive integer, the quantity of PRACH CE levels defined for the SSB being based at least in part on the N PRACH CE levels per SSB, wherein at least one of:
      the configuration defines the same quantity of PRACH CE levels for each SSB of the plurality of SSBs and the power measurement thresholds are commonly applied to the plurality of SSBs, or
      the configuration defines the power measurement thresholds per SSB and the particular quantity of PRACH CE levels and separate power measurement thresholds are configured for each SSB of the plurality of SSBs.

2. The UE of claim 1, wherein the one or more processors, when selecting the SSB from the plurality of SSBs, are configured to select the SSB based at least in part on the power measurement associated with the SSB in relation to power measurements associated with other SSBs in the plurality of SSBs.

3. The UE of claim 2, wherein the power measurement is a reference signal received power measurement.

4. The UE of claim 2, wherein the power measurement associated with the SSB is greater than the power measurements associated with the other SSBs in the plurality of SSBs.

5. The UE of claim 1, wherein the one or more processors, when determining the PRACH CE level, are configured to:
   compare the power measurement associated with the SSB to a set of power measurement thresholds, wherein each power measurement threshold is associated with a different PRACH CE level.

6. The UE of claim 1, wherein the one or more processors, when determining the PRACH CE level, are configured to:
   compare the power measurement associated with the SSB to a set of power measurement thresholds that are specific to the SSB, wherein each power measurement threshold is associated with a different PRACH CE level.

7. The UE of claim 1, wherein the one or more processors are further configured to:
select the PRACH resources associated with the SSB and the PRACH CE level.

8. The UE of claim 1, wherein the one or more processors are further configured to:
determine a PRACH repetition number associated with one or more of the PRACH CE level or the SSB, and wherein the one or more processors, when performing the PRACH transmission, are configured to perform the PRACH transmission in accordance with the PRACH repetition number.

9. The UE of claim 1, wherein the PRACH resources are partitioned based at least in part on the SSB and power measurement threshold.

10. The UE of claim 9, wherein the PRACH resources are partitioned in one or more of: a time domain, or a frequency domain.

11. The UE of claim 9, wherein the PRACH resources are partitioned based at least in part by different sequences within a same time and frequency resource.

12. The UE of claim 1, wherein the one or more processors are further configured to:
receive, from the network entity, a system information block that includes a configuration for N PRACH CE levels per SSB and power measurement thresholds for each PRACH CE level, wherein N is a positive integer, the quantity of PRACH CE levels defined for the SSB being based at least in part on the N PRACH CE levels per SSB.

13. The UE of claim 1, wherein the PRACH transmission is a Msg-1 or a Msg-A of a random access channel procedure.

14. The UE of claim 13, wherein a first repetition number is configured for the PRACH transmission associated with the Msg-A and a second repetition number is configured for a physical uplink shared channel (PUSCH) transmission associated with the Msg-A for each CE level.

15. The UE of claim 1, wherein the PRACH CE level is associated with a defined number of PRACH repetitions for the PRACH transmission.

16. A method of wireless communication performed by a user equipment (UE), comprising:
selecting a synchronization signal block (SSB) from a plurality of SSBs received from a network entity based at least in part on a power measurement associated with the SSB;
determining a physical random access channel (PRACH) coverage enhancement (CE) level from a quantity of PRACH CE levels defined for the SSB, at least one of a same quantity of PRACH CE levels being defined for each SSB of the plurality of SSBs or a particular quantity of PRACH CE levels being defined per SSB for each SSB of the plurality of SSBs;
performing, with the network entity, a PRACH transmission on PRACH resources associated with the SSB and the PRACH CE level; and
receiving, from the network entity, a system information block that includes a configuration for N PRACH CE levels per SSB and power measurement thresholds for each PRACH CE level, wherein N is a positive integer, the quantity of PRACH CE levels defined for the SSB being based at least in part on the N PRACH CE levels per SSB, wherein at least one of:

the configuration defines the same quantity of PRACH CE levels for each SSB of the plurality of SSBs and the power measurement thresholds are commonly applied to the plurality of SSBs, or
the configuration defines the power measurement thresholds per SSB and the particular quantity of PRACH CE levels and separate power measurement thresholds are configured for each SSB of the plurality of SSBs.

17. The method of claim 16, wherein selecting the SSB from the plurality of SSBs comprises selecting the SSB based at least in part on the power measurement associated with the SSB in relation to power measurements associated with other SSBs in the plurality of SSBs, wherein the power measurement is a reference signal received power measurement, and wherein the power measurement associated with the SSB is greater than the power measurements associated with the other SSBs in the plurality of SSBs.

18. The method of claim 16, wherein:
determining the PRACH CE level comprises comparing the power measurement associated with the SSB to a set of power measurement thresholds, wherein each power measurement threshold is associated with a different PRACH CE level; and
determining the PRACH CE level comprises comparing the power measurement associated with the SSB to a set of power measurement thresholds that are specific to the SSB, wherein each power measurement threshold is associated with a different PRACH CE level.

19. The method of claim 16, further comprising:
selecting the PRACH resources associated with the SSB and the PRACH CE level; and
determining a PRACH repetition number associated with one or more of the PRACH CE level or the SSB, and wherein performing the PRACH transmission comprises performing the PRACH transmission in accordance with the PRACH repetition number.

20. The method of claim 16, wherein:
the PRACH resources are partitioned based at least in part on the SSB and power measurement threshold;
the PRACH resources are partitioned in one or more of: a time domain, or a frequency domain;
the PRACH resources are partitioned based at least in part by different sequences within a same time and frequency resource; or
the PRACH CE level is associated with a defined number of PRACH repetitions for the PRACH transmission.

21. The method of claim 16, wherein the PRACH transmission is a Msg-1 or a Msg-A of a random access channel procedure, wherein a first repetition number is configured for the PRACH transmission associated with the Msg-A and a second repetition number is configured for a physical uplink shared channel (PUSCH) transmission associated with the Msg-A for each CE level.

22. A non-transitory computer-readable medium storing a set of instructions for wireless communication, the set of instructions comprising:
one or more instructions that, when executed by one or more processors of a user equipment (UE), cause the UE to:
select a synchronization signal block (SSB) from a plurality of SSBs received from a network entity based at least in part on a power measurement associated with the SSB;
determine a physical random access channel (PRACH) coverage enhancement (CE) level from a quantity of PRACH CE levels defined for the SSB, at least one of a same quantity of PRACH CE levels being defined for each SSB of the plurality of SSBs or a particular quantity of PRACH CE levels being defined per SSB for each SSB of the plurality of SSBs;

perform, with the network entity, a PRACH transmission on PRACH resources associated with the SSB and the PRACH CE level; and receive, from the network entity, a system information block that includes a configuration for N PRACH CE levels per SSB and power measurement thresholds for each PRACH CE level, wherein N is a positive integer, the quantity of PRACH CE levels defined for the SSB being based at least in part on the N PRACH CE levels per SSB, wherein at least one of:

the configuration defines the same quantity of PRACH CE levels for each SSB of the plurality of SSBs and the power measurement thresholds are commonly applied to the plurality of SSBs, or the configuration defines the power measurement thresholds per SSB and the particular quantity of PRACH CE levels and separate power measurement thresholds are configured for each SSB of the plurality of SSBs.

23. The non-transitory computer-readable medium of claim 22, wherein the one or more instructions, that cause the UE to select the SSB from the plurality of SSBs, cause the UE to select the SSB based at least in part on the power measurement associated with the SSB in relation to power measurements associated with other SSBs in the plurality of SSBs, wherein the power measurement is a reference signal received power measurement, and wherein the power measurement associated with the SSB is greater than the power measurements associated with the other SSBs in the plurality of SSBs.

24. The non-transitory computer-readable medium of claim 22, wherein the one or more instructions, that cause the UE to determine the PRACH CE level, cause the UE to:

compare the power measurement associated with the SSB to a set of power measurement thresholds, wherein each power measurement threshold is associated with a different PRACH CE level; or compare the power measurement associated with the SSB to a set of power measurement thresholds that are specific to the SSB, wherein each power measurement threshold is associated with a different PRACH CE level.

25. An apparatus for wireless communication, comprising:

means for selecting a synchronization signal block (SSB) from a plurality of SSBs received from a network entity based at least in part on a power measurement associated with the SSB;

means for determining a physical random access channel (PRACH) coverage enhancement (CE) level from a quantity of PRACH CE levels defined for the SSB, at least one of a same quantity of PRACH CE levels being defined for each SSB of the plurality of SSBs or a particular quantity of PRACH CE levels being defined per SSB for each SSB of the plurality of SSBs;

means for performing, with the network entity, a PRACH transmission on PRACH resources associated with the SSB and the PRACH CE level; and means for receiving, from the network entity, a system information block that includes a configuration for N PRACH CE levels per SSB and power measurement thresholds for each PRACH CE level, wherein N is a positive integer, the quantity of PRACH CE levels defined for the SSB being based at least in part on the N PRACH CE levels per SSB, and wherein at least one of:

the configuration defines the same quantity of PRACH CE levels for each SSB of the plurality of SSBs and the power measurement thresholds are commonly applied to the plurality of SSBs, or the configuration defines the power measurement thresholds per SSB and the particular quantity of PRACH CE levels and separate power measurement thresholds are configured for each SSB of the plurality of SSBs.

26. The apparatus of claim 25, further comprising:

means for selecting the PRACH resources associated with the SSB and the PRACH CE level; and means for determining a PRACH repetition number associated with one or more of the PRACH CE level or the SSB; and wherein the means for performing the PRACH transmission comprises means for performing the PRACH transmission in accordance with the PRACH repetition number.

* * * * *